United States Patent [19]

Rourke et al.

[11] Patent Number: 5,309,558

[45] Date of Patent: May 3, 1994

[54] SET ADDRESSING FOR ELECTRONIC PRINTING MACHINES

[75] Inventors: John L. Rourke, Fairport; Steven M. Rousos, Spencerport, both of N.Y.

[73] Assignee: Xerox Corporation, Stamford, Conn.

[21] Appl. No.: 628,130

[22] Filed: Dec. 14, 1990

[51] Int. Cl.$^5$ .............................................. G06F 15/00
[52] U.S. Cl. ..................................... 395/166; 355/40; 395/115
[58] Field of Search ............... 395/101, 115, 116, 117, 395/162, 164, 165, 166; 400/68; 355/200, 202, 204, 208, 210, 39, 40

[56] References Cited

U.S. PATENT DOCUMENTS

| | | | |
|---|---|---|---|
| 4,085,445 | 4/1978 | Blevins et al. | 364/900 |
| 4,124,286 | 11/1978 | Barasch | 355/3 R |
| 4,306,803 | 12/1987 | Donohue | 355/14 C |
| 4,322,157 | 3/1982 | Miura et al. | 355/14 C |
| 4,494,862 | 1/1985 | Tanaka | 355/14 C |
| 4,521,096 | 6/1985 | Suganuma et al. | 355/3 R |
| 4,542,378 | 9/1985 | Suganuma et al. | 340/734 |
| 4,639,791 | 1/1987 | Masaki | 358/300 |
| 4,674,040 | 6/1987 | Barker et al. | 364/300 |
| 4,920,337 | 4/1990 | Kuo | 340/721 |
| 4,992,827 | 2/1991 | Kobayashi et al. | 355/202 |
| 5,016,048 | 5/1991 | Watanabe | 355/202 |
| 5,091,746 | 2/1992 | Watanabe | 395/100 |

FOREIGN PATENT DOCUMENTS

0374892A2 6/1990 European Pat. Off. .

OTHER PUBLICATIONS

Acerson, K. L. [1988]. WordPerfect ®: The Complete Reference, McGraw-Hill, California. pp. (245-248).

Primary Examiner—Dale M. Shaw
Assistant Examiner—Kee M. Tung
Attorney, Agent, or Firm—Frederick E. McMullen

[57] ABSTRACT

A process of addressing sets in which a list of M addresses is stored in a memory of a printer and the printer is programmed to print one or more sets of N prints on print media. A print outline, with a selected identifiable area superimposed thereon, is displayed on an interactive display screen. In one example of operation, copies of the M addresses from the list are successively printed on N prints at the selected identifiable area on each of the N prints.

14 Claims, 21 Drawing Sheets

FIG. 7

SET ADDRESSING FOR ELECTRONIC PRINTING MACHINES

The present invention is related to the following co-pending application, both applications being assigned to the same assignee: U.S. patent application Ser. No. 07/590,633, filed Sep. 28, 1990 to Hengst et al., entitled "Process for Merging Merge Items with Prints Produced by Electronic Printing Machines".

The invention relates to electronic printing systems, and more particularly, to a process for creating, storing, and using addresses on prints produced by the system.

Electronic printing systems employ image signals or pixels as the image source when producing prints. In using printing systems of this type, a very desirable option would be the ability to automatically add information, i.e., addresses, to the prints or print sets as they are produced. This would save the cost, time, and bother of subsequently addressing the prints later as for example by pasting address labels on the prints, handwriting the addresses, etc. To gain maximum use of an option of this type, referred to as set addressing herein, the user must have the ability to pick and choose the addresses that are to be used. This requires editing capability that will allow the user to temporarily remove some addresses from his address list in accordance with the demands of a particular job. Further, the user needs the ability to re-shuffle the order and position of the addresses in the address list, to add addresses from other lists, to change the size of the addresses and the position of the addresses on the prints, etc. And, there also must be provided a way in which the user can easily create new electronic address lists to add to the operator's address library for future jobs.

In the prior art, U.S. Pat. Nos. 4,521,096 to Suganuma et al and 4,322,157 to Miura et al disclose apparatus for combining information from different forms to generate documents with composite images based on data from several image memory sources. U.S. Pat. No. 4,639,791 to Masaki discloses an image overlay apparatus with electronic image storage in which a combined image is created by overlaying images from two different sources. And U.S. Pat. No. 4,124,286 to Barasch discloses a system for printing a composite image wherein a first image is formed on a photoconductive media and then transferred to a second photoconductive media where a second image is formed overlay the first image.

In contrast, the present invention provides a set addressing process for use with an electronic printing system having a printer for making prints on a print media from image signals, memory means for storing the image signals, and programming means for programming the system to produce prints, comprising the steps of: providing a list of N addresses for use in addressing prints produced by the printer; storing the list in the memory; programming the printer to print one or more sets of N prints on the print media; accessing the address list in the memory means; printing addresses from the list successively on the prints as the prints are printed on the print media; and repeating the preceding step for each set of prints printed.

IN THE DRAWINGS

Figure 1:
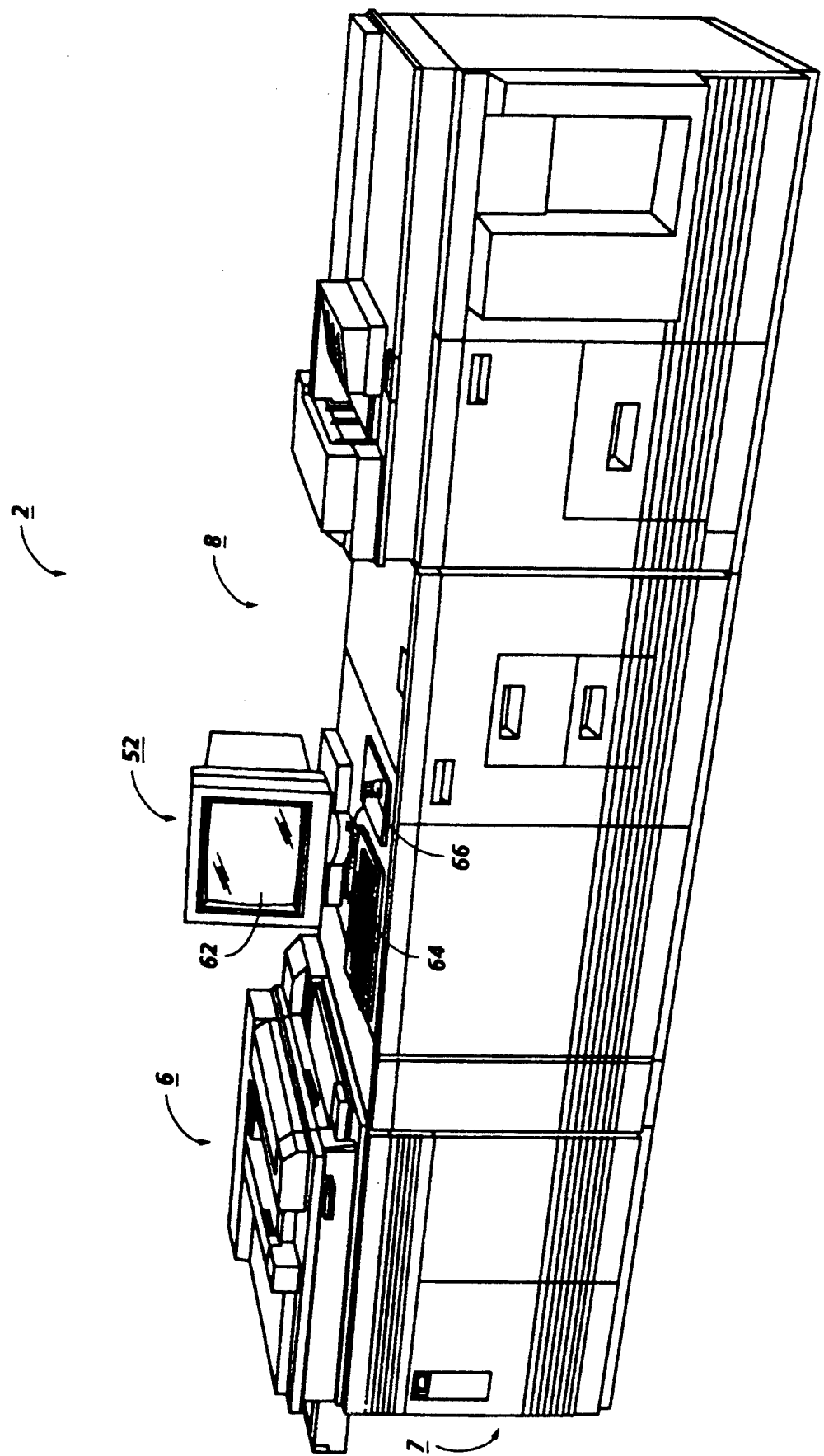
FIG. 1 is a view depicting an electronic printing system incorporating the set addressing process of the present invention.
Figure 5A:
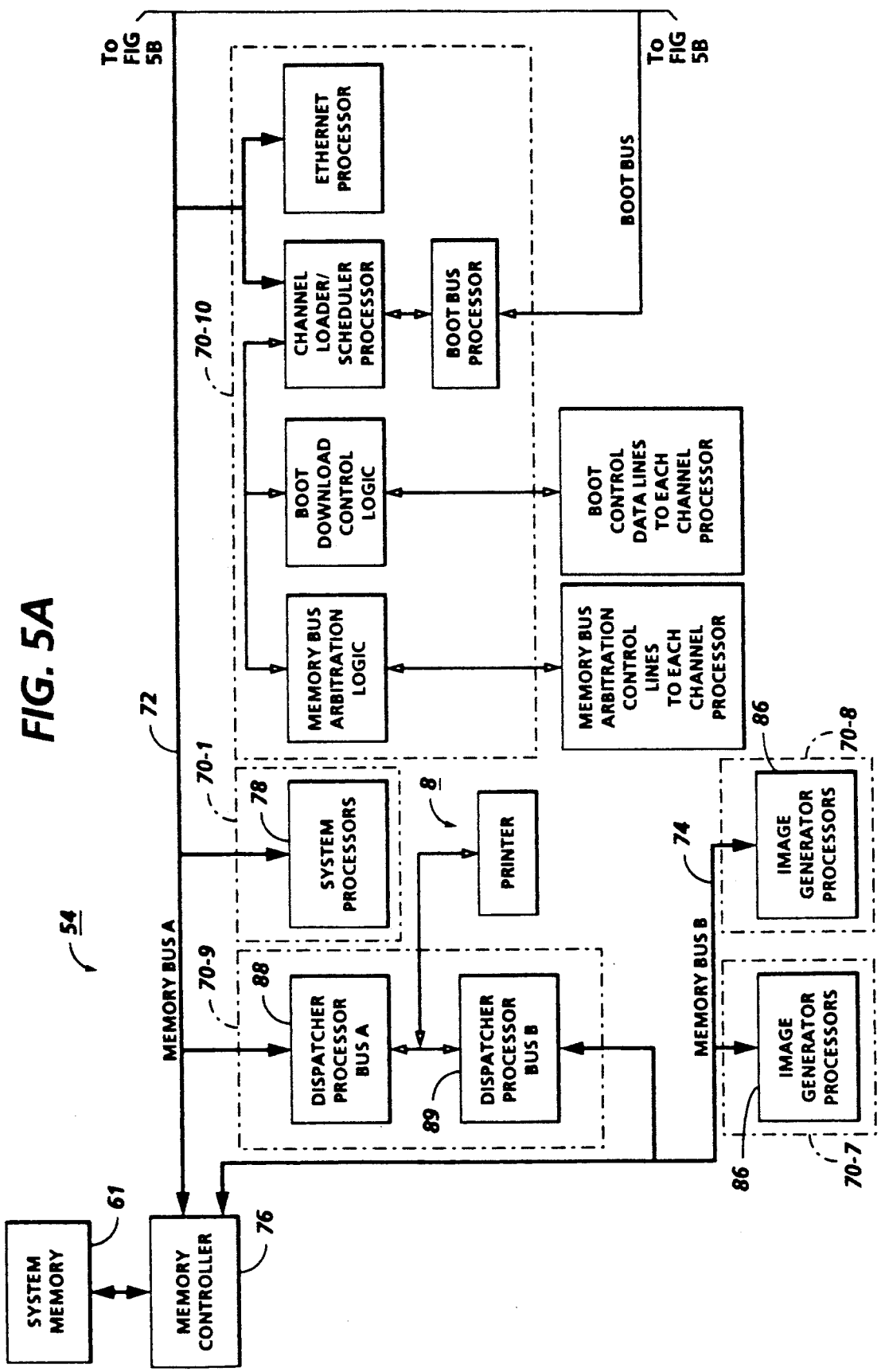
Figure 5B:
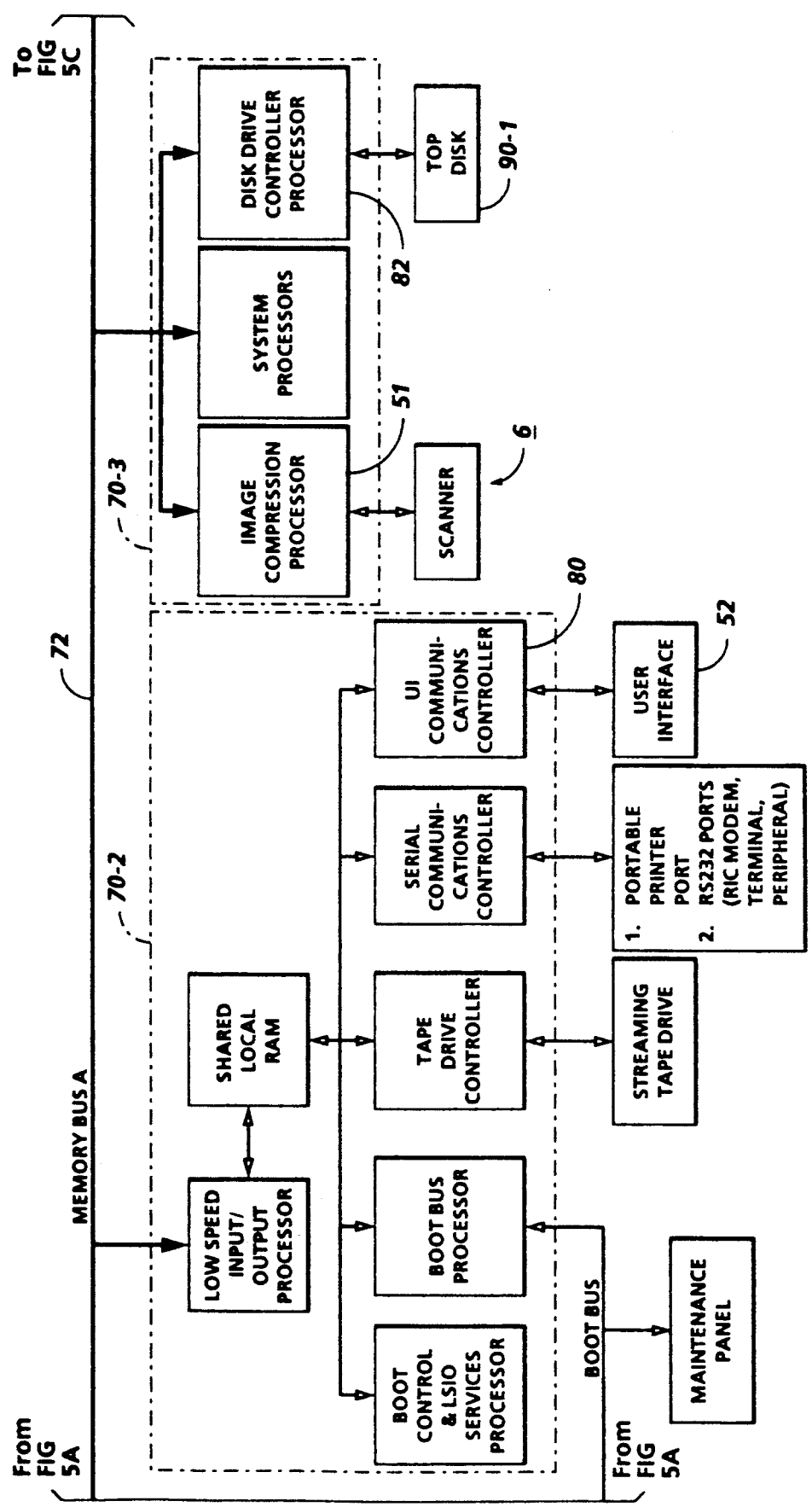
Figure 5C:
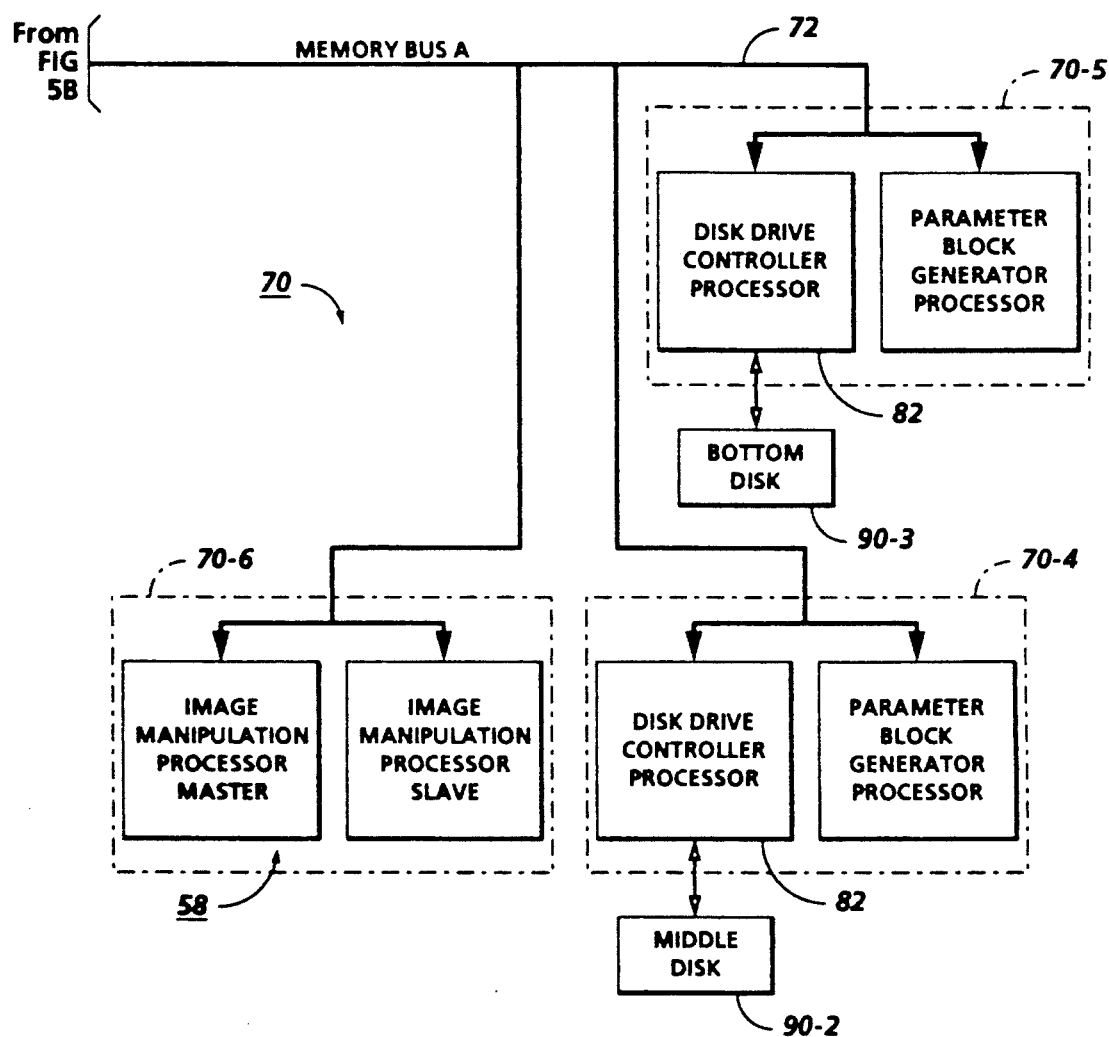
Figure 6:
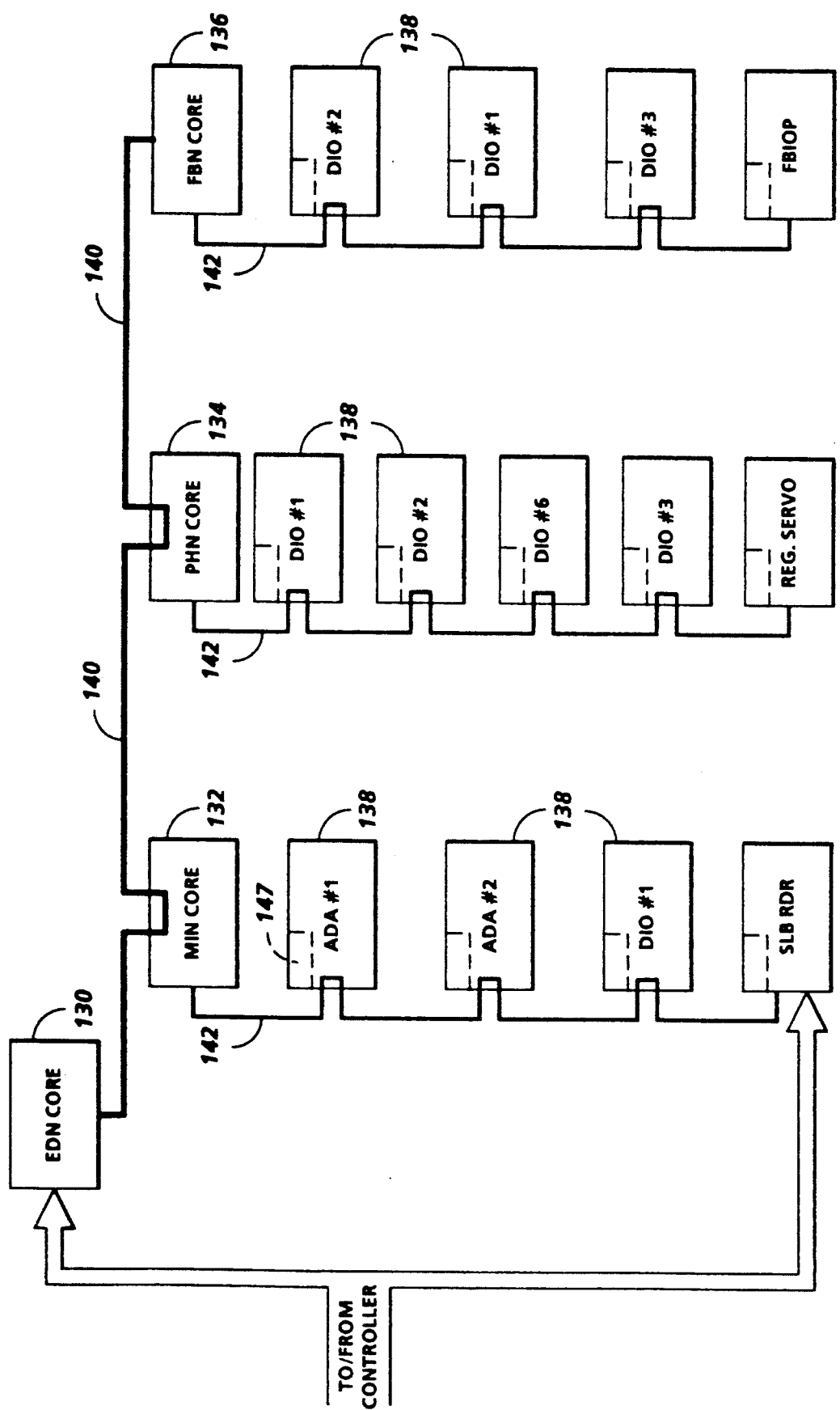
Figure 8:
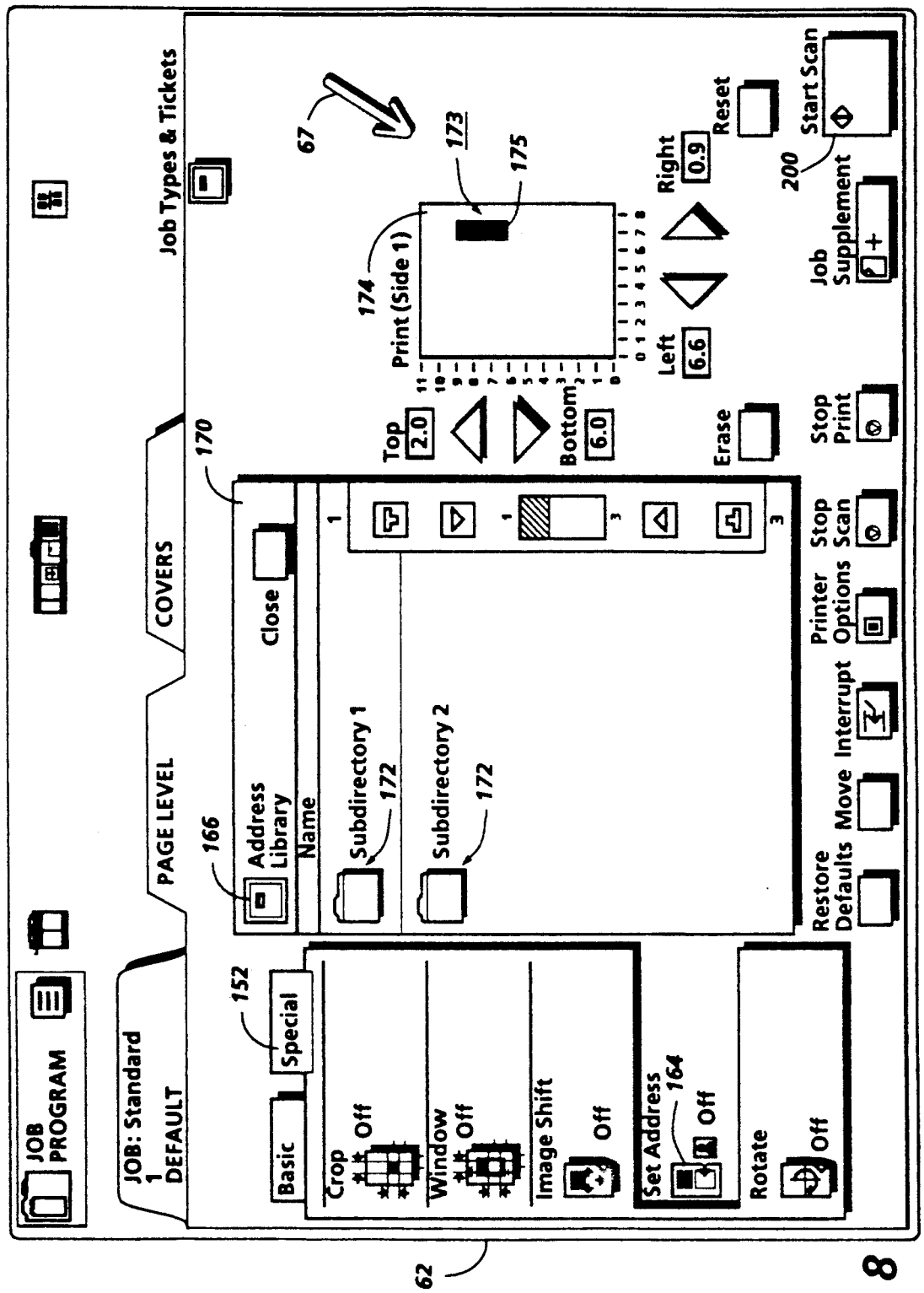
Figure 9:
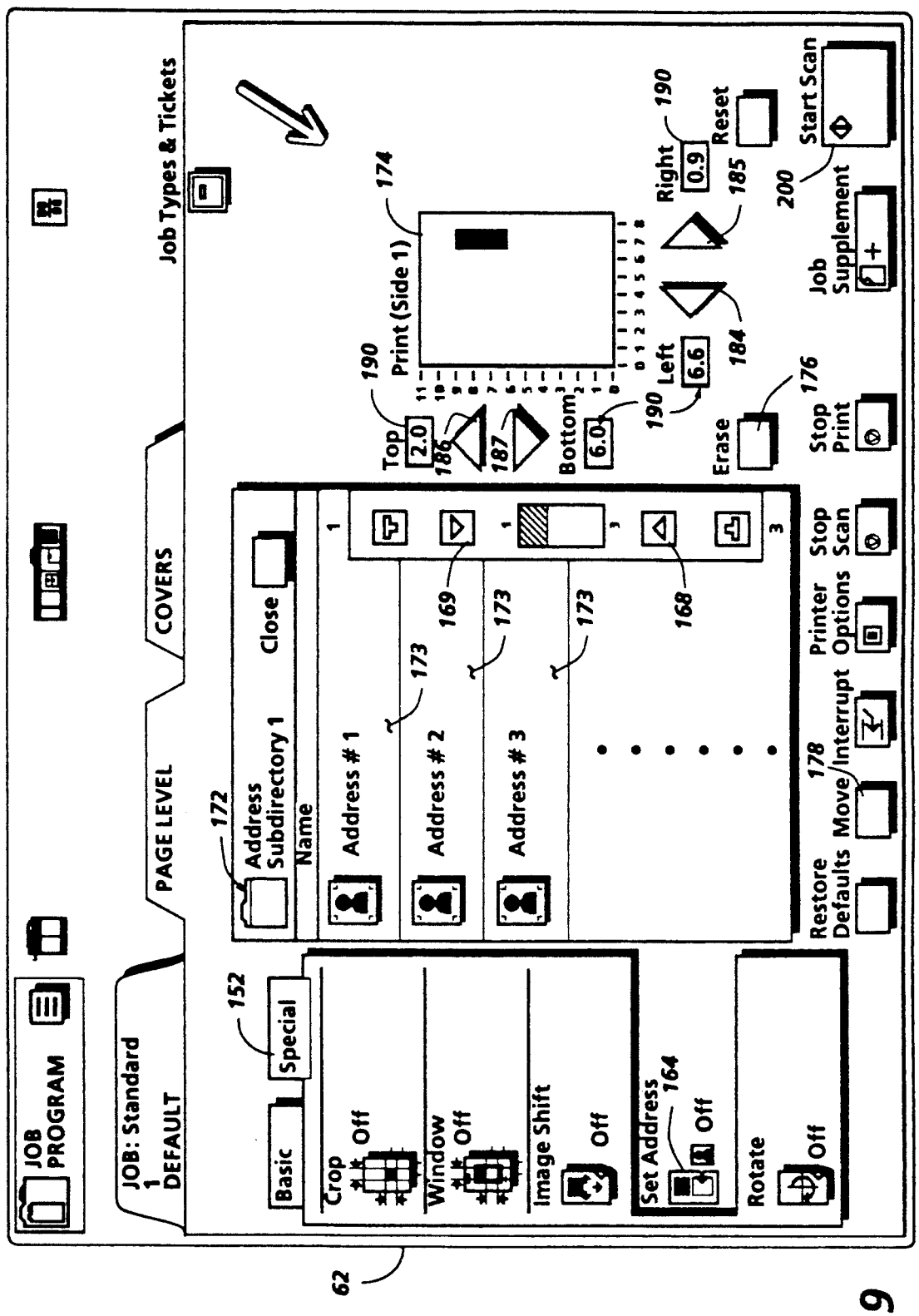
Figure 10:
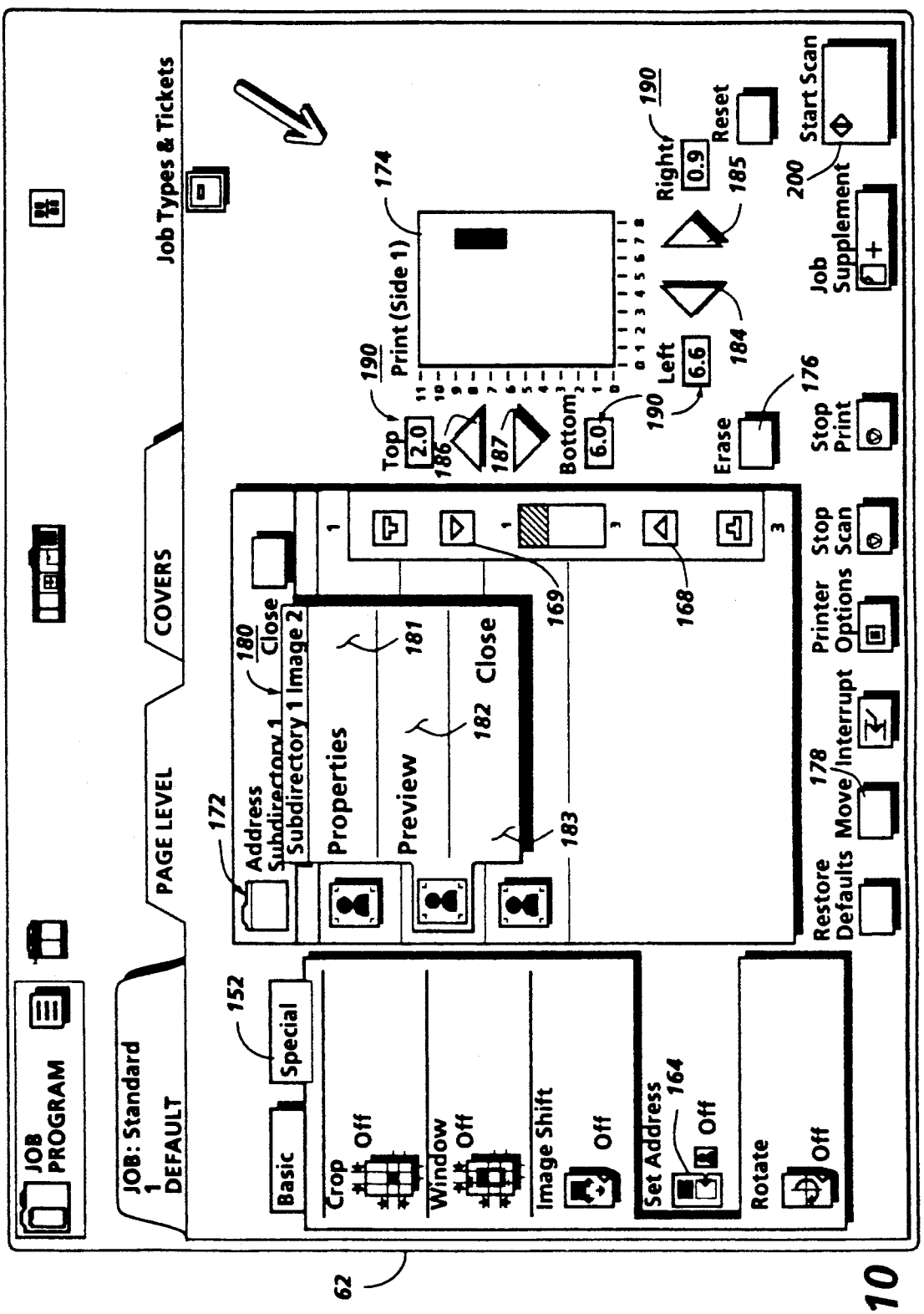
Figure 11:
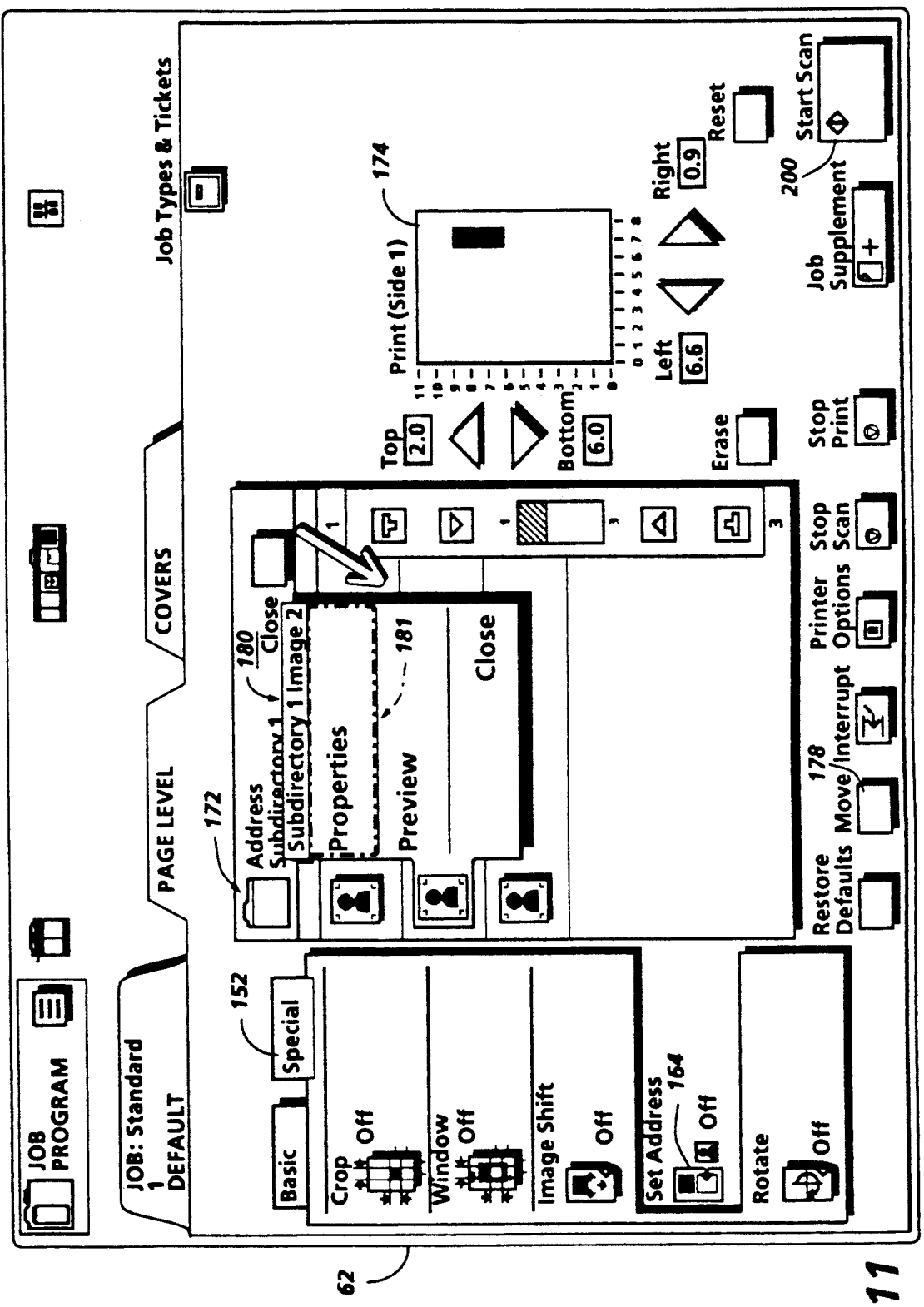
Figure 12:
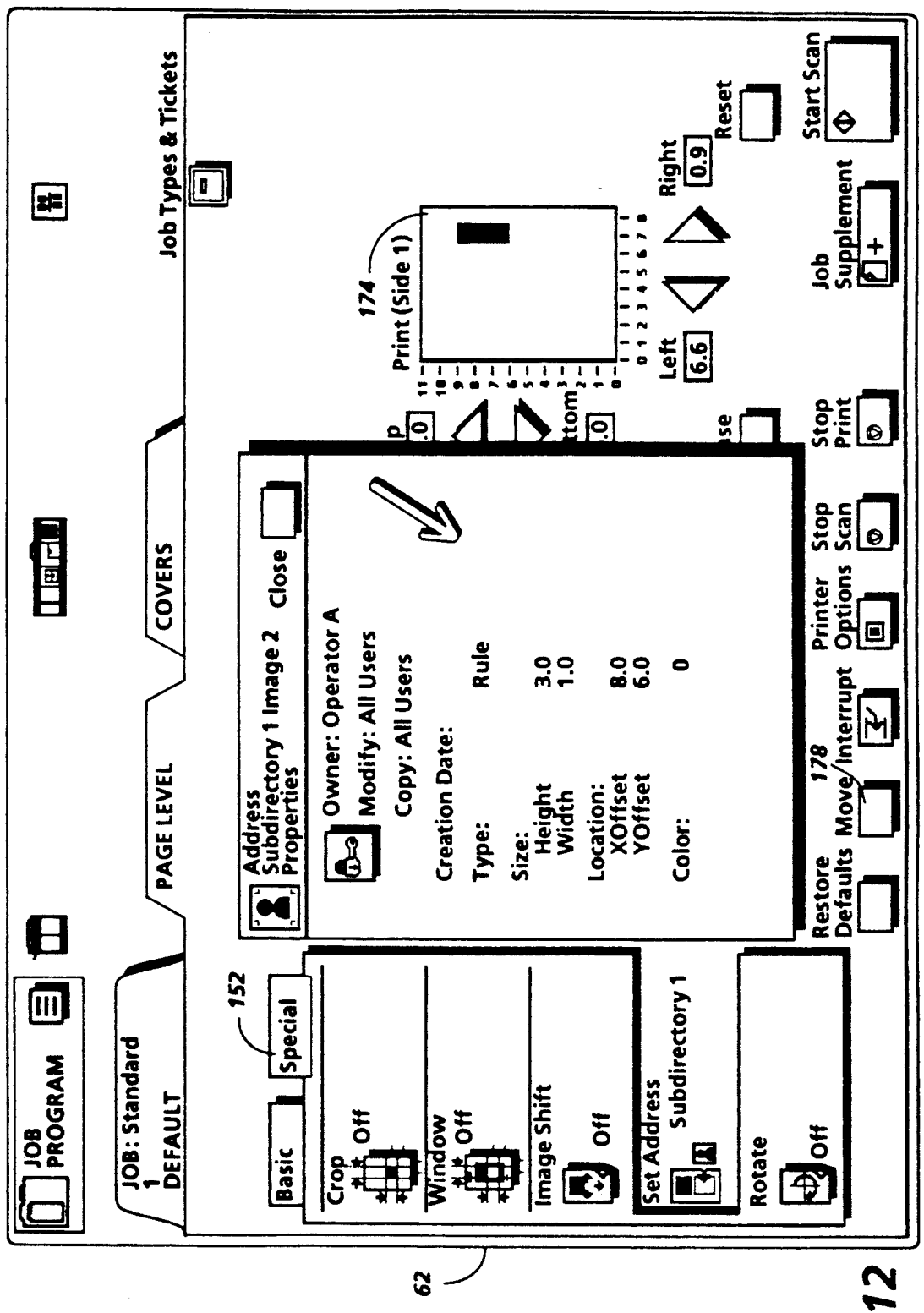
Figure 13:
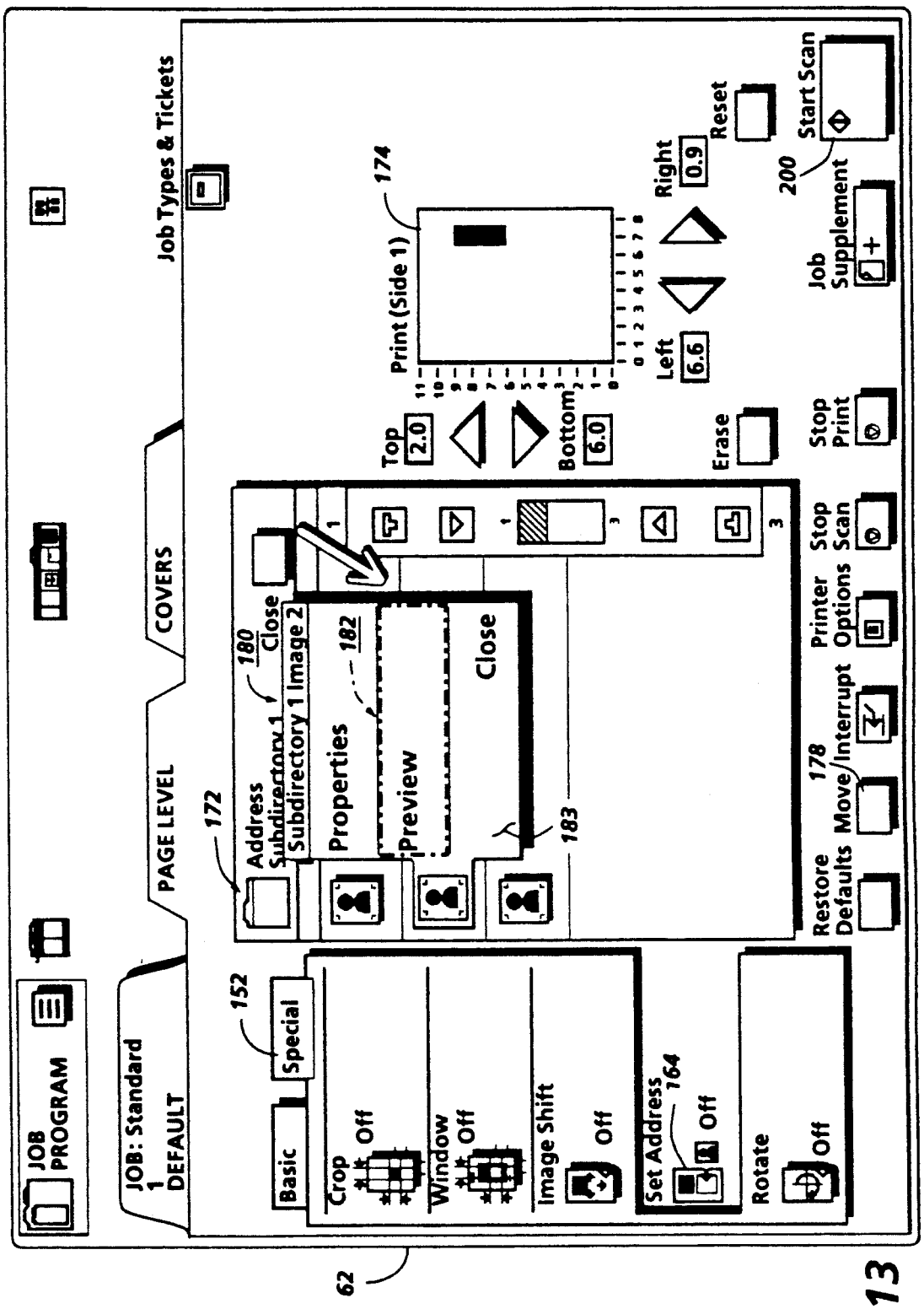
Figure 14:
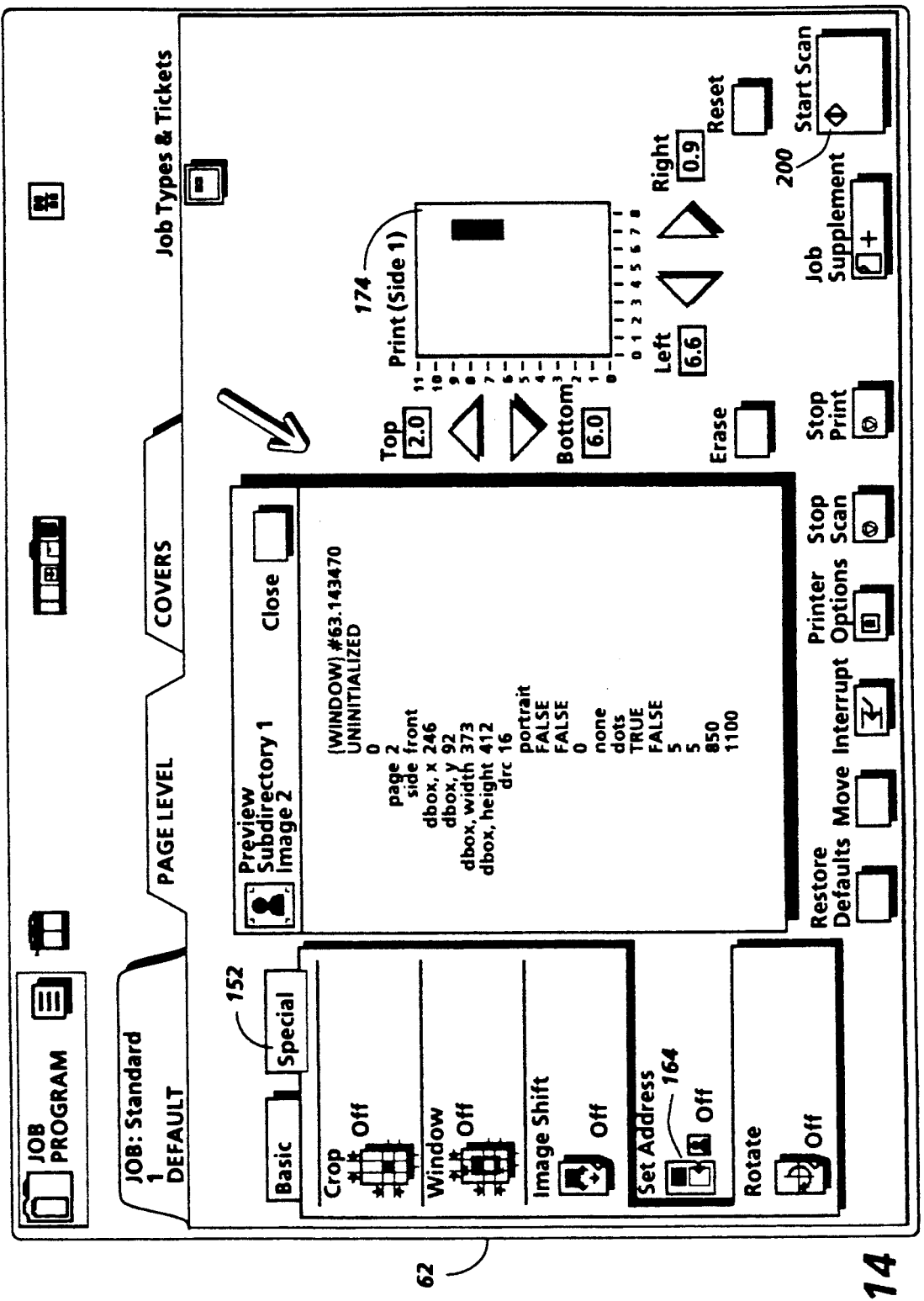
Figure 15A:
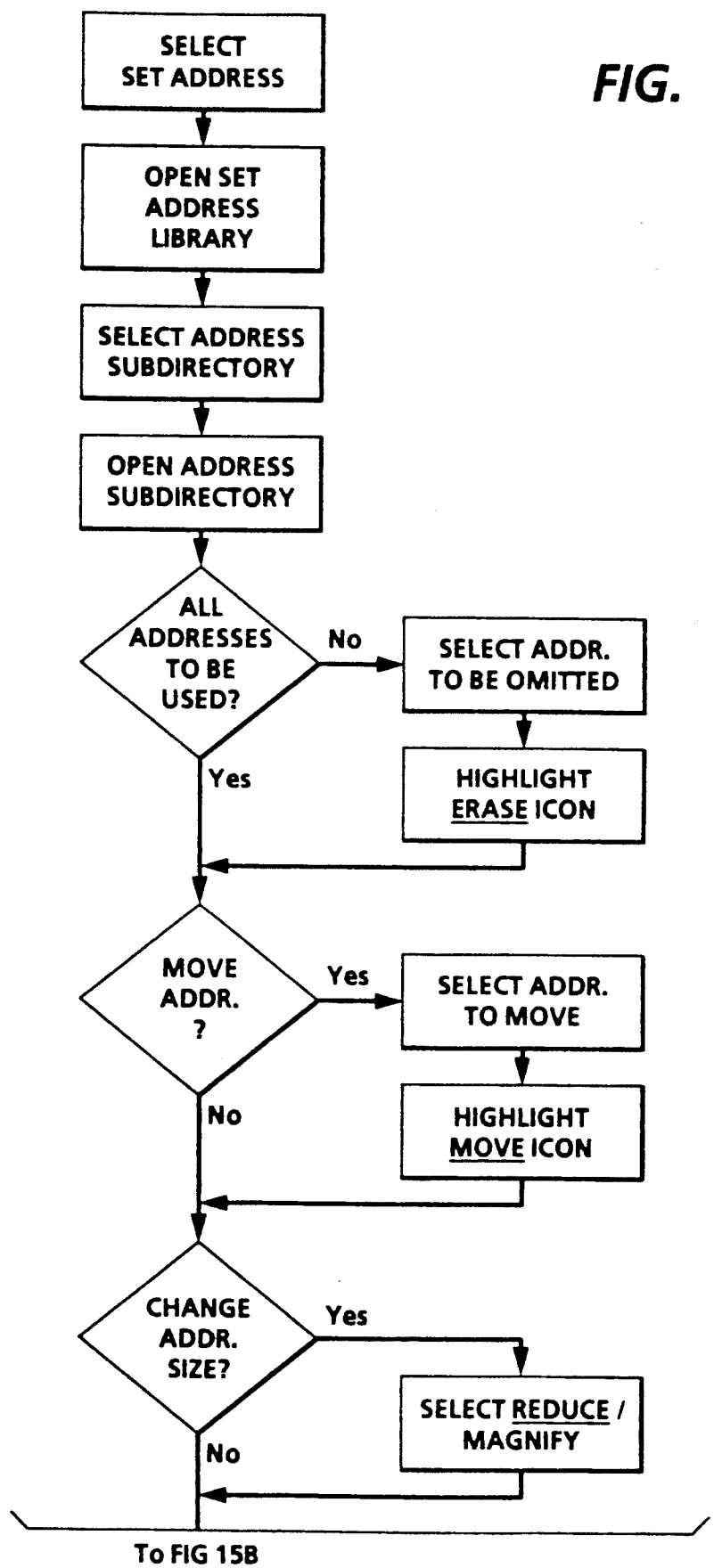
Figure 15B:
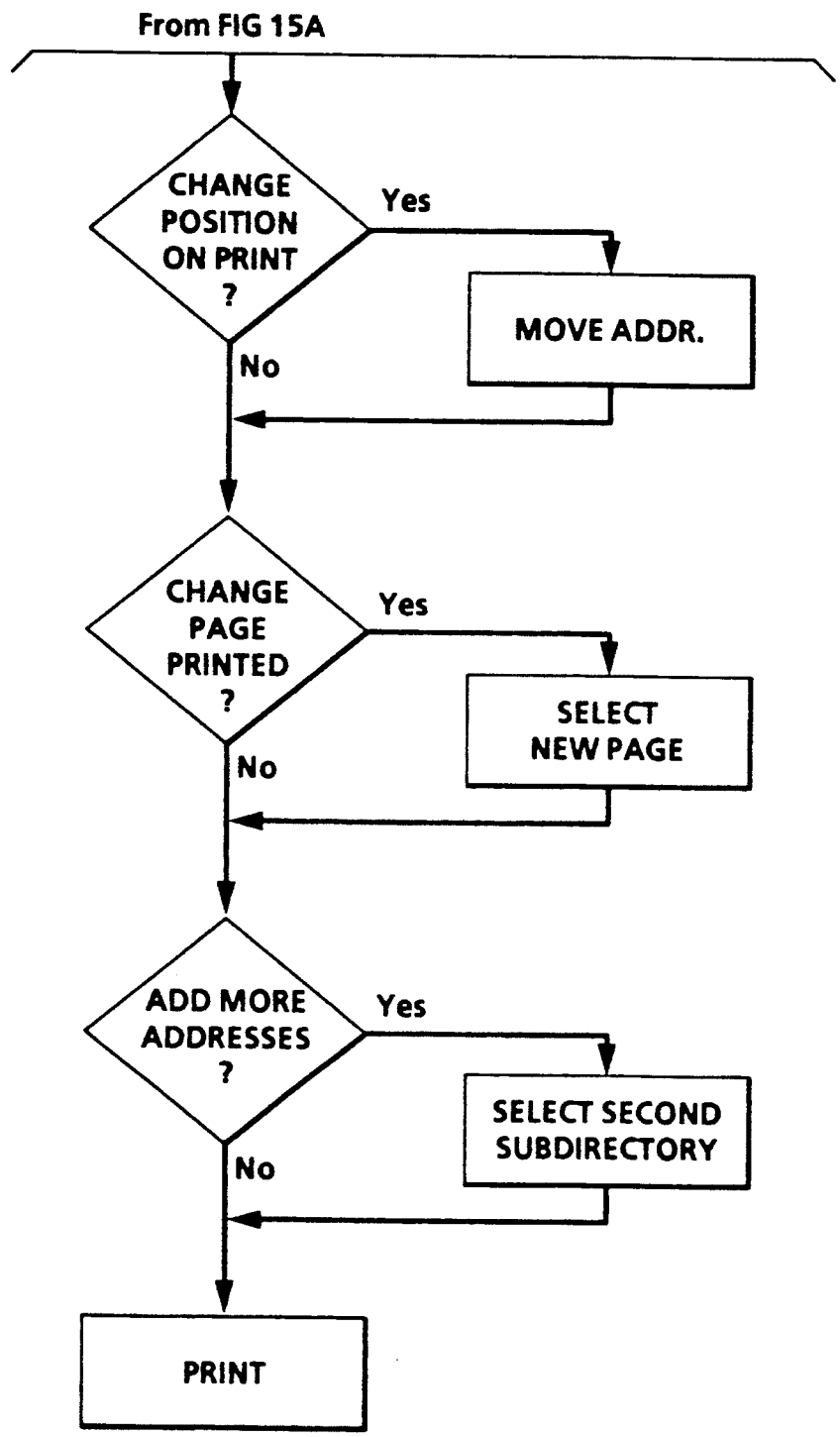
Figure 16:
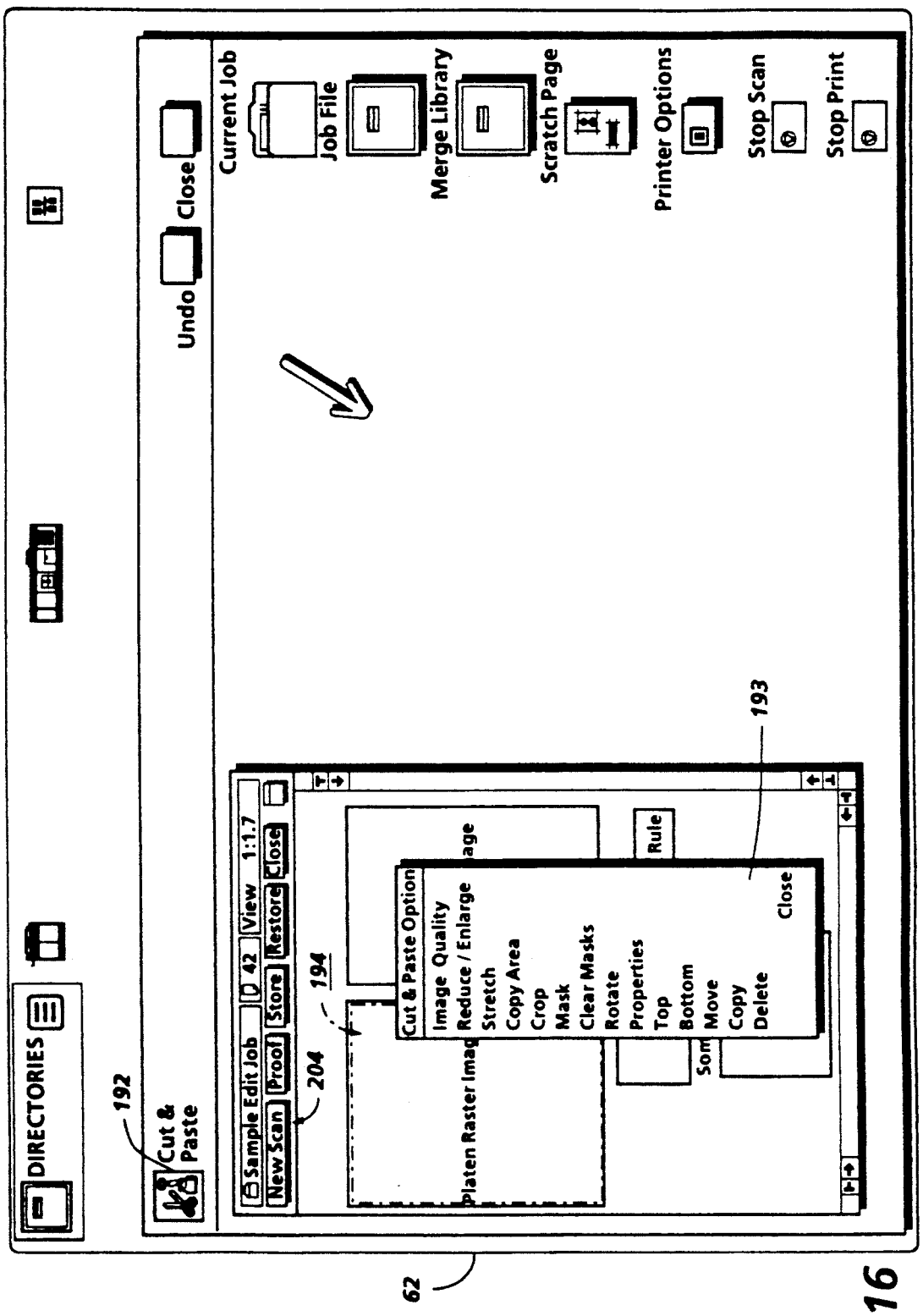
Figure 17:
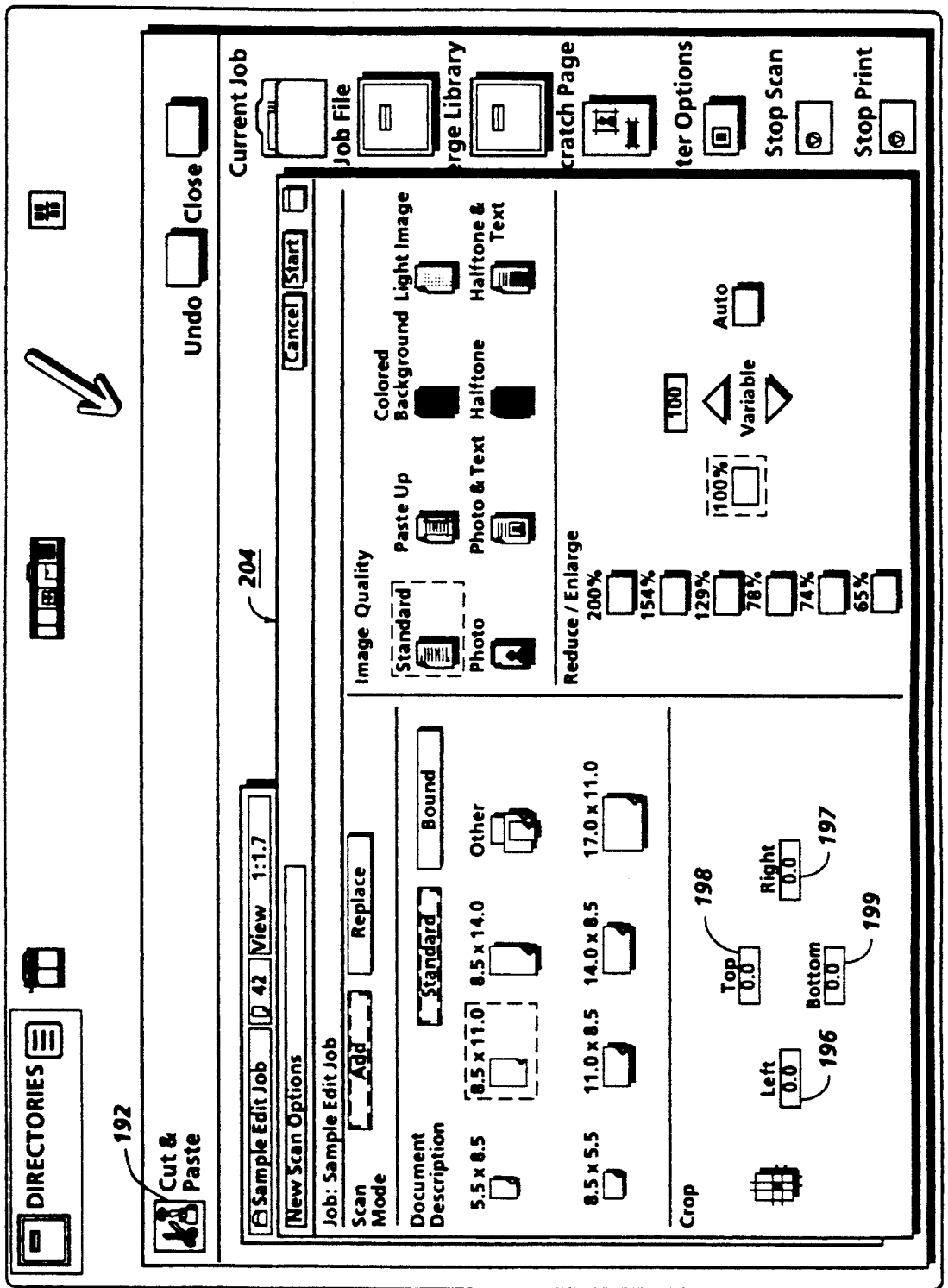
Figure 18:
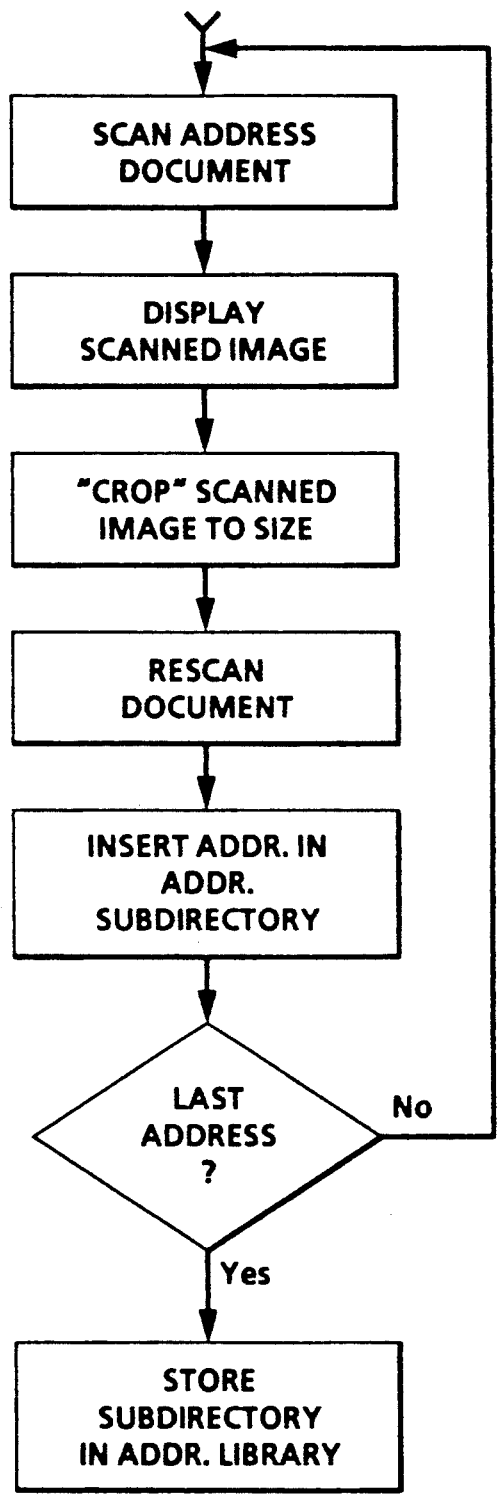

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

Figure 7:
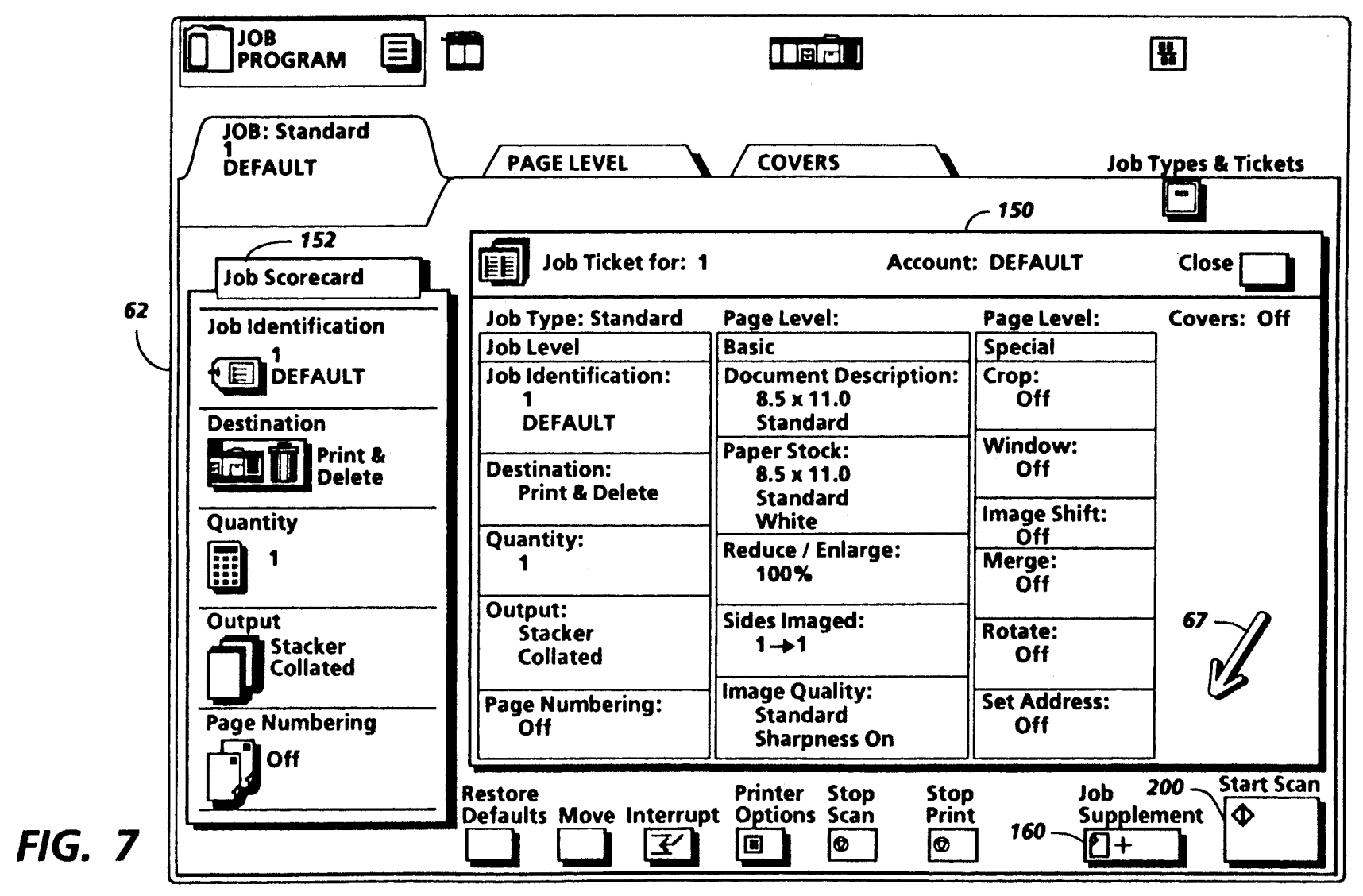

FIG. 7 is a view depicting a Job Ticket with Job Scorecard for programming set addressing jobs as displayed on the User Interface (UI) touchscreen of the printing system shown in FIG. 1;

FIG. 8 is a view of the touchscreen display depicting the programming selections for accessing the Set Addressing function of the present invention;

FIG. 9 is a view of the touchscreen display in which examples of addresses in a selected address subdirectory are displayed following opening of the subdirectory;

FIG. 10 is a view of the touchscreen display depicting the property sheet selections for an address subdirectory;

FIG. 11 is a view of the touchscreen display with the Property Sheet Properties selection highlighted;

FIG. 12 is a view of the touchscreen display depicting an example of the address properties following highlighting of the Properties selection;

FIG. 13 is a view of the touchscreen display with the Property Sheet Preview selection highlighted;

FIG. 14 is a view of the touchscreen display depicting and example of the address properties following highlighting of the Preview selection;

FIGS. 15A and 15B comprise a flow chart depicting the process for selecting an address file from the set address library;

FIG. 16 is a view of the touchscreen display depicting cut and paste programming features for creating addresses for an address subdirectory;

FIG. 17 is a view of the touchscreen display depicting the cut and paste selections; and FIG. 18 is a flow chart illustrating the creation of an address for creating addresses.

Figure 2:
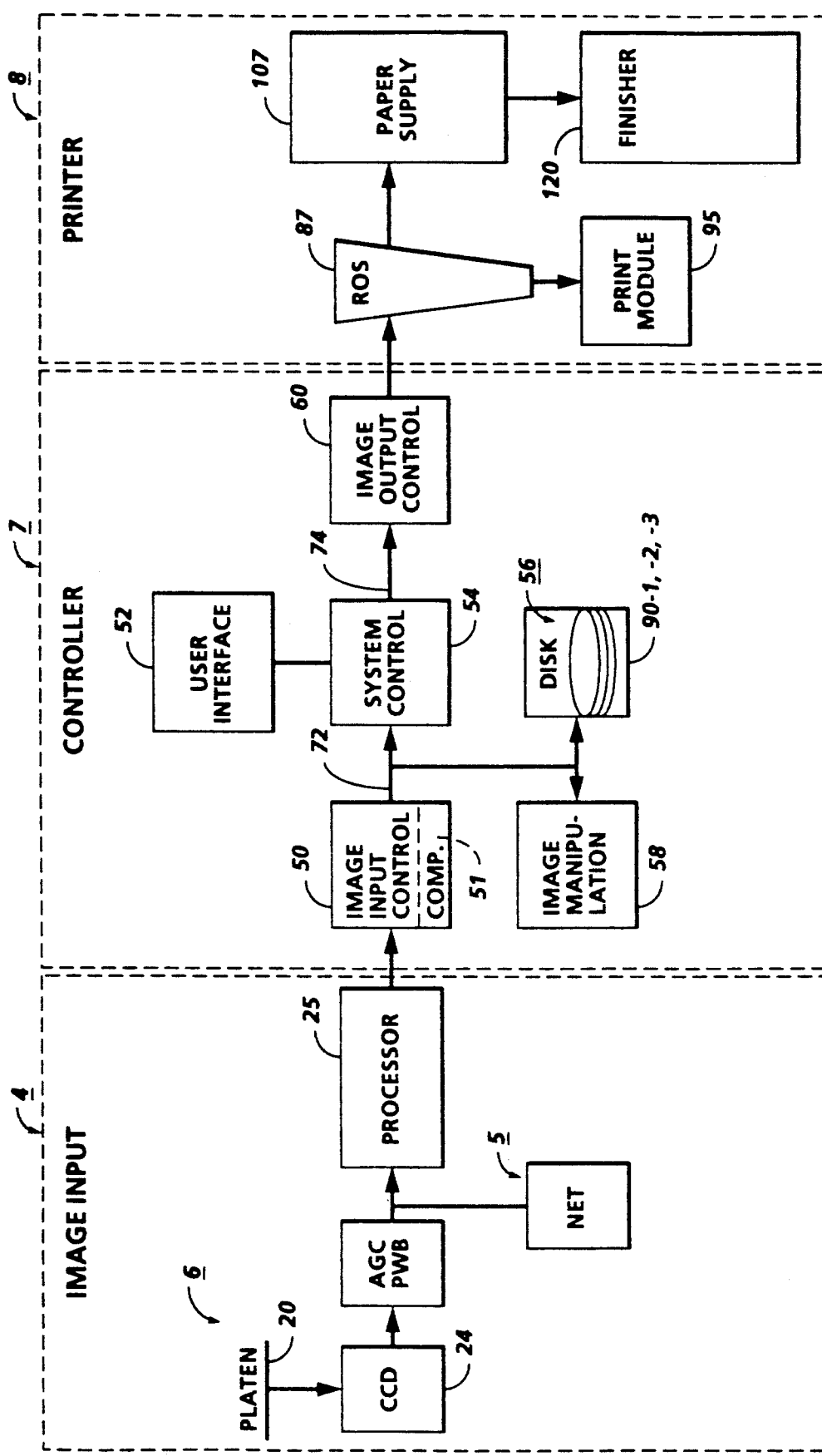
FIG. 2 is a block diagram depicting the major elements of the printing system shown in FIG. 1.

Referring to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc. While a specific printing system is shown and described, the present invention may be used with other types of printing systems. For example, printer section 8 may instead use a different printer type such as ink jet, ionographic, etc.

Figure 3:
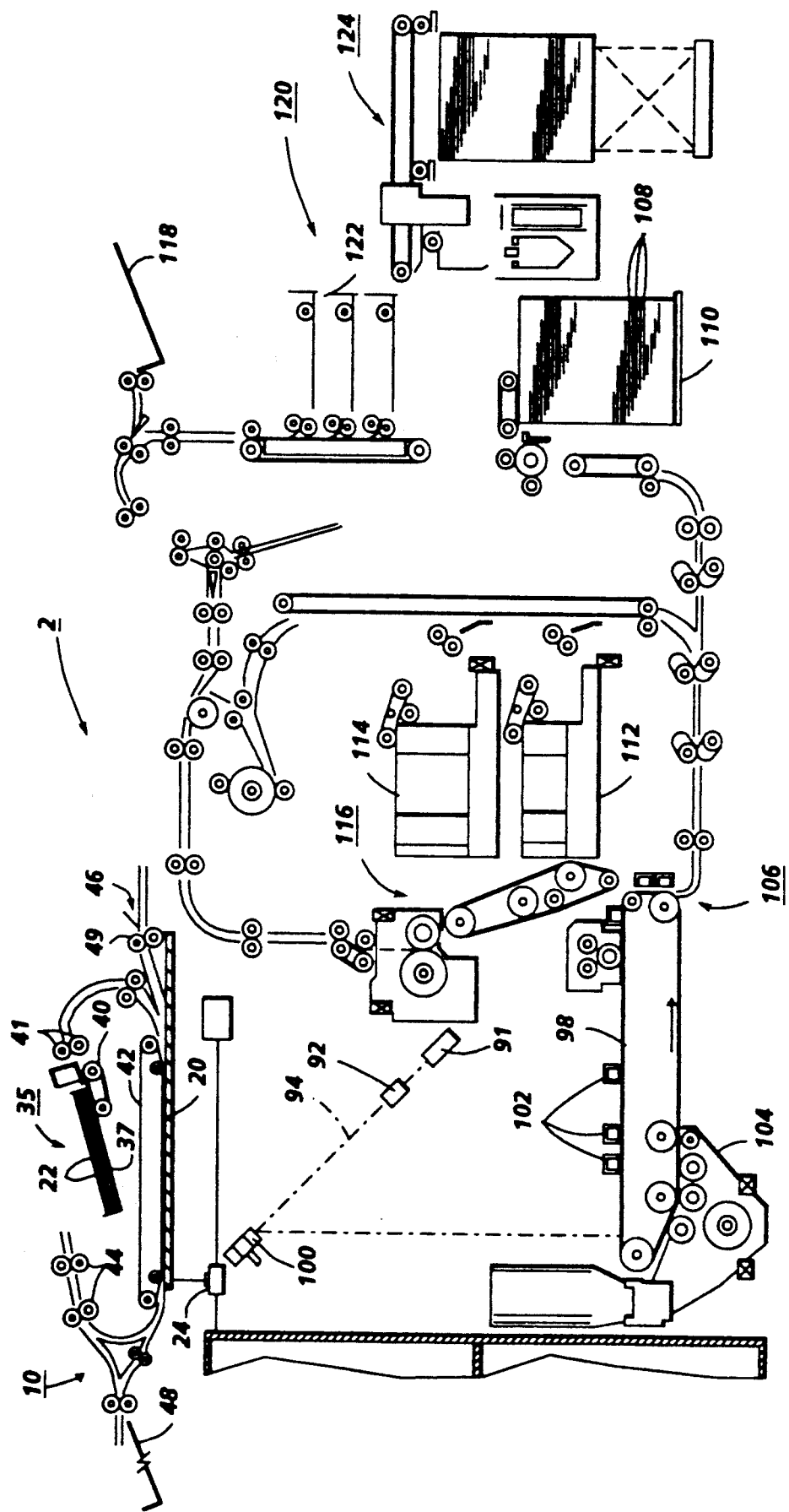
FIG. 3 is a plan view illustrating the principal mechanical components of the printing system shown in FIG. 1.
Figure 4:
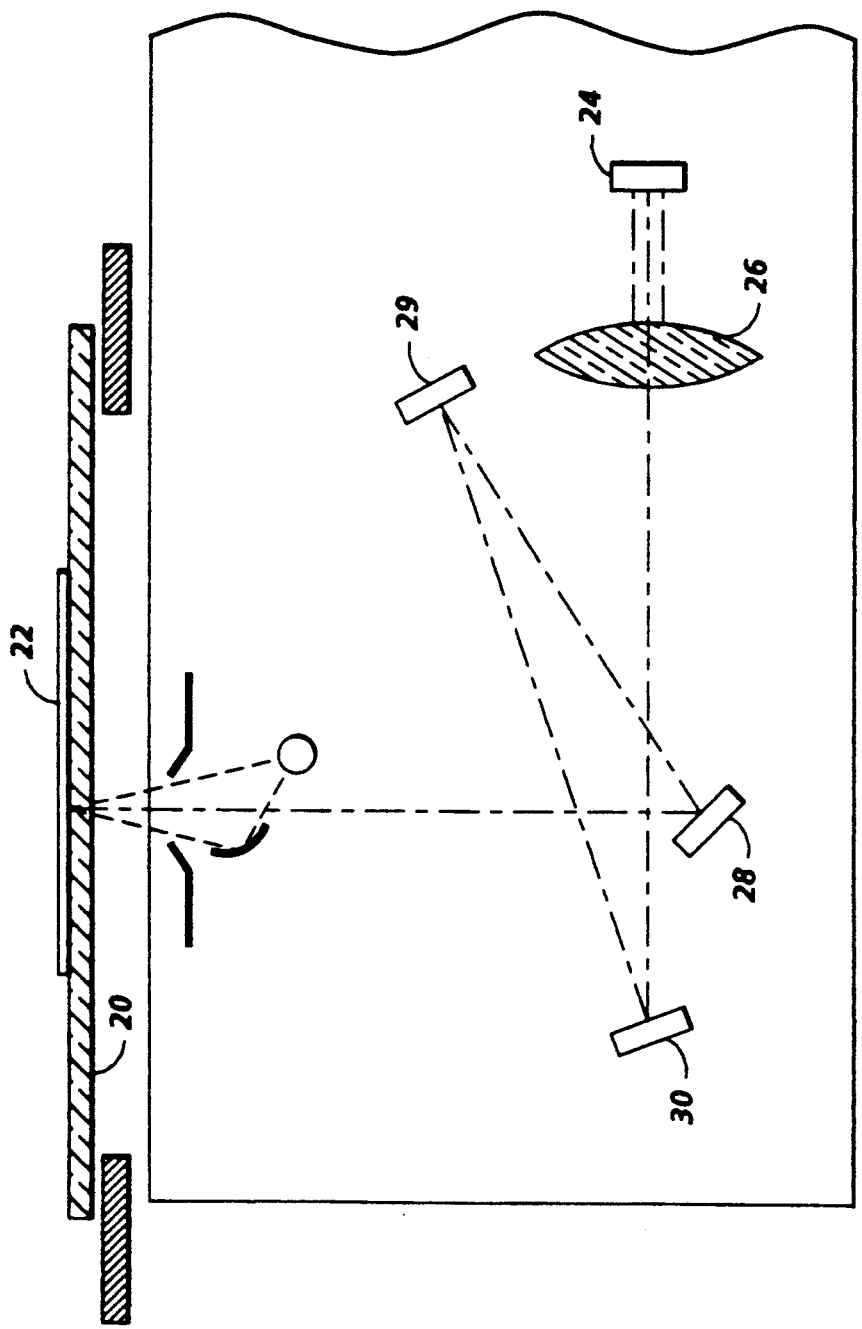
FIG. 4 is a schematic view showing certain construction details of the document scanner for the printing system shown in FIG. 1.

Referring particularly to FIGS. 2–4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (note shown) are provided. Other remote sources of image data such as streaming tape, floppy disk, etc. may be envisioned.

For on-site image input, section 4 has a document scanner 6 with a transparent platen 20 on which documents 22 to be scanned are located. One or more linear arrays 24 are supported for reciprocating scanning movement below platen 20. Lens 27 and mirrors 28, 29, 30 cooperate to focus array 24 on a line-like segment of platen 20 and the document being scanned thereon. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a suitable print media, referred to as Paper Stock 108, delivered by Paper Supply section 107. Paper Stock 108 as will appear may comprise any of a variety of sheet sizes, types, and colors. For transfer, the Paper Stock is brought forward in timed registration with the developed image on photoreceptor 98 from either a main paper tray 110 or from auxiliary paper trays 112, or 114. The developed image transferred to the Paper Stock 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Image data input from processor 25 of image input section 4 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print Jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBS) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with master and slave image manipulation processors 59, 59' respectively of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking imaging core PWB 132, Paper Handling core PWB 134, and Finisher Binder core PWB 136 together with various Input/Output (1/0) PWBs 138. A system bus 140 couples the core PWBs 130, 132, 134, 136 with each other and with controller section 7 while local buses 142 serve to couple the 1/0 PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from 1/0 PWBs 138 via local buses 142. Additional ROM, RAM, and NVM memory types are resident at various locations within system 2.

Items such as files and icons displayed on touchscreen 62 are described herein as being highlighted, actuated, opened, or selected by either touching the displayed item or pointing curser 67 at the item and keying mouse 66.

Referring to FIG. 7, jobs are programmed in a Job Program mode in which there is displayed on touchscreen 62 a Job Ticket 150 and a Job Scorecard 1 52 for the job being programmed. Job Ticket 150 displays various job selections programmed while Job Scorecard 1 52 displays the basic instructions to the system for printing the job. Various Job Ticket types are provided, with access by means of Job Types and Tickets icon 157. In the example shown in FIG. 7, the Job Ticket for programming set addressing jobs is displayed.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

Referring to FIGS. 8 and 15 also, selecting SET ADDRESS on Job Ticket 150 in the "Special" programming level displays "Special" Scorecard 152 on touchscreen 12 with SET ADDRESS icon 164 opened. There is also displayed on touchscreen 62 a Set Address Library card file 170 together with Set Address Library icon 166. Actuating icon 166 displays, in numerical order, the address subdirectories 172 currently in the set address library. A print outline 174 with darkened area 175 to represent the relative size, orientation, and location of addresses 173 on the Paper Stock 108 currently programmed is also displayed on touchscreen 62 on one side of card file 170. Print outline 174 has a numerical scale along one side and the bottom to facilitate determination of the size, orientation and location of addresses 173 on the Paper Stock.

Referring to FIGS. 9 and 15, highlighting a subdirectory 172 displays the addresses 173 currently in the subdirectory. Descriptors identify the subdirectory 172 in which the address belongs, the number of the address in the directory, and the size of the addresses. Typically, addresses 173 comprise a name and street address (i.e., number, street, city, and Zip Code) of an individual or organization. The specific address, the total number of addresses in the subdirectory, the numerical order in which each address appears in the subdirectory addresses, and the order in which the addresses are arranged in a subdirectory are determined by the operator. Typically, the addresses comprise a customer mailing or distribution list.

Once the desired subdirectory 172 has been selected, SET ADDRESS icon 164 is closed to program the set addressing function. When the job being programmed is printed, the addresses 173 from the subdirectory are successively printed on the prints at the position selected, starting with the first address in the directory and ending with the last address in the directory. The minimum number N of prints or print sets is automatically programmed to equal the number of addresses N in the address subdirectory selected. Additional multiples or sets can be selected by means of the "Quantity" programming option on Job Ticket 150. Further, the operator can set the number of prints for a set to a specific address.

Other programming options include the ability to in effect divide the printed item such as a report to address portions to different addressees. For example, with a job/set, the operator can segregate the introduction of the report being printed from the main body of the report and distribute to different levels, i.e., an executive summary of the report can be addressed by one or more of the addresses in the directory with the full report addressed by the other addresses in the directory.

Referring again to FIG. 7, programming options for printing system 2 are preset to default selections as for example the default number of prints or sets is one (i.e., Quantity of "1"), the default size, type and color of the print media is, 8.5"×11", Standard, White Paper Stock, etc. Where programming options other than the default settings are desired, the corresponding one of the selections on Job Ticket 150 is highlighted. This displays the various choices from which programming selections may be made. Following selection of each programming change desired, the display returns to the Job Ticket level on closure of the programming icon for any further selection.

In cases where the operator is familiar with the contents of the subdirectory 172 to be used and desires to use all of the addresses in the the subdirectory in the same order as the addresses currently appear in the directory, opening of the subdirectory may not be necessary. Alternately, the operator may print out the addresses from the selected subdirectory on the Paper Stock where a hard copy of the addresses is desired. Where the operator wishes to review, change, or edit the addresses, the directory is opened to display the addresses on touchscreen 12 as shown in FIG. 9. Since the number of addresses 150 in a subdirectory is typically more than can be displayed at one time on touchscreen 12, scrolling of the addresses is enabled by up and down scrolling icons 168, 169 respectively.

Where it is desired to skip or not use one or more of the addresses 173, the particular address or addresses are deactivated by highlighting the address or addresses and actuating erase icon 176. The deactivated address or addresses will not be deleted from the subdirectory but will be skipped during printing. The minimum number of prints or print sets will automatically be changed to equal the number of addresses that are to be printed.

The order in which the addresses 163 are presented in the address file may be changed. This may be done by highlighting a particular address, actuating MOVE icon 178, pointing cursor 67 to the place in the subdirectory where the address is to be moved to, and keying mouse 64.

Where it is desired to supplement the addresses from one subdirectory with the addresses from another subdirectory, the second subdirectory is selected in the manner described for selecting the first address. On closure of SET ADDRESS icon 164, the addresses in the second subdirectory will be accessed and printed following the printing of the last address in the first subdirectory.

Referring to FIGS. 10-12, where the operator desires to view and change the properties of an address in a subdirectory, the address is highlighted to display a property sheet 180 having Properties, Preview, and Close selections 181, 182, and 183 respectively. Selecting Properties 181 displays the properties of the addresses in the subdirectory. These include the owner, creation date, security restrictions, etc. together with the size and location of the address in numbers corresponding to the numerical scale shown in print outline 174. Concurrently, the size and position of the outline 175 on print 174 is showing the relative size and position that the address will appear on the print.

Selecting Preview 182 (FIGS. 13 and 14) displays further and somewhat more specific data about the address such as the side of the Paper Stock on which the address will be printed, the page in the print set on which the the address will be printed, the current position and size of the addresses on the Paper Stock in inches, type of addresses, etc.

Referring to FIGS. 9 and 10, to enable the operator to change the size of the addresses in the subdirectory, or to change the position on the Paper Stock where the addresses will be printed, there is provided pairs of X direction and Y direction scrolling icons 184, 185 and 186, 187 respectively. By selective use of scrolling icons 184, and 185, the size of the addresses and/or the position of the addresses on the Paper Stock along the X axis may be changed. Similarly, by selective use of scrolling icons 186 and 187, the size of the addresses and/or the position of the addresses along the Y axis may be changed. Numerical displays 190, show the X and Y positions of the addresses.

Following changes to the address size, address location on the Paper Stock, the side and page on which the addresses are printed, etc. Close selection 183 is actuated to close property sheet 176. Subsequent closure of SET ADDRESS 164 icon programs the addresses from the selected subdirectory for printing with the job.

Referring to FIGS. 16-18, subdirectories 172 of addresses may be created in one of several ways. For example, documents having the addresses thereon may be scanned in using scanner section 6 in the appropriate mode. In this case, since the addresses are smaller in size than the area of platen 20 scanned, the scanned address image requires processing to remove extraneous images. It may also be desirable at that time to set other address properties, such as size, orientation, etc.

To program scanner section 6 so that only the address is scanned, a cut and paste routine is used. To enable cut and paste, cut and paste icon 192 displayed on touchscreen 62 is actuated. This displays a window 193 with various Edit Options available in this programming mode. An outline 194 ("Platen Raster image") of the image area scanned is also displayed on touchscreen 62. NEW SCAN icon 204 is selected to cause scanner section 6 to scan the address bearing document on platen 20. Following initial scanning, the document is retained on platen 20 until the cut and paste process is completed as will appear.

By selecting "Crop" in the Edit Options shown in FIG. 17 are displayed on touchscreen 62. Selecting Crop and using left and right side scrolling icons 196, 197 on screen 62 and top and bottom scrolling icons 198, 199 allow the side, top, and bottom margins of the address image 173 to be set for cropping. The cropped areas are deleted leaving only the address image.

Following completion of cropping, other Edit Options may be selected such as REDUCE/ENLARGE which enables the size of the address image to be changed, ROTATE which enables the orientation of the address image to be changed, etc.

When the operator is satisfied with the address image, scanning is again actuated to cause scanner section 6 to rescan the address bearing document on platen 20, However, because of the scanner programming input provided in the aforedescribed cut and paste cropping routine, only the address portion of the document is scanned. Other changes programmed, i.e., REDUCE/ENLARGE, ROTATE, etc. are carried out by processor 25. The finished address is inserted into the address subdirectory 172.

Additional addresses may be similarly created by scanning addresses or lists of addresses on documents and, after processing, placing the addresses in the address subdirectory. When the last address is entered into the subdirectory, the directory is closed to store the subdirectory in the set Address Library.

Another source of addresses is a prepared address sheet containing labels/addresses. An example of this is a '33-up' mailer sheet. The system can be programmed to crop a specific address location or by step and repeat, scan in each address individually and place the address in a stored sequential list. The above can be done in a single scan or in multiple scans.

Further, electronic addresses can be received from remote sources over network 5, or from streaming tape, etc. for inclusion in the system storage of addresses. Additionally, electronic addresses can be generated using keyboard 64.

While the invention has been described with reference to the structure disclosed, it is not confined to the details set forth, but is intended to cover such modifications or changes as may come within the scope of the following claims.

We claim:

1. A process of addressing sets for use with an electronic printing system having a user interface with an interactive display screen and a printer for making prints on a print media from image signals, a memory for storing the image signals, and programming means for programming said electronic printing system to produce prints, comprising the steps of:
   a) providing a list of M addresses, with a first address and an Mth address, for use in addressing prints produced by said printer;
   b) storing said list of M addresses in said memory;
   c) programming said printer to print one or more sets of N prints on said print media, said N prints including a first print and an Nth print;
   d) displaying, on said interactive display screen, a print outline with a selected identifiable area, said selected identifiable area being positioned on said print outline and representing a relative size, location and orientation of an area on each of the N prints upon which each of said M addresses is to be printed;
   e) printing copies of the M addresses from said list of M addresses successively on said N prints, at said selected identifiable area on each of said N prints, as said N prints are printed on said print media, said first address in said list of M addresses being printed at said identifiable area of said first print and said Mth address in said list of M addresses being printed at said identifiable area of said Nth print.

2. The process according to claim 1, in which said list of M addresses is disposed in a document original, further including the steps of:
   a) scanning said document and converting said list of M addresses to image signals to provide said list of M addresses; and
   b) storing said image signals for said list of M addresses in said memory.

3. The process according to claim 1 including the step of:
   partitioning said addresses in said list of M addresses from one another to allow said addresses to be separately printed on said prints.

4. The process according to claim 1, in which the position of said selected identifiable area is adjustable, further comprising the step of adjusting the position of said selected identifiable area.

5. The process according to claim 1 including the step of:
   printing said addresses from said list of M addresses in sequence onto said print media to provide a hard copy of said list of M addresses.

6. The process according to claim 1 including the steps of:
   providing a second list of addresses for use in addressing prints produced by said printer;
   merging selected portions of said list of M addresses with selected portions of said second list of addresses to form a merged list of addresses; and
   printing said merged list of addresses on print media to provide a hard copy thereof.

7. The process according to claim 1, in which each of said M addresses assumes a relative position in said list of M addresses, further including the steps of editing said list of M addresses to change said addresses or the relative position of said addresses in said list of M addresses.

8. The process according to claim 1 including the step of:
   editing said list of M addresses to provide selected ones of said addresses on said list of M addresses with special properties.

9. The process according to claim 1 including the step of:
   obtaining said list of M addresses from a remote source through a communication channel.

10. The process according to claim 1, in which the size of each address in the list of M addresses is adjustable, further comprising the step of adjusting the size of selected ones of said N addresses in said list of M addresses.

11. The process according to claim 1, wherein M is greater than or equal to N.

12. An apparatus for addressing sets, comprising:
    a) a memory for storing a list of M addresses, said list of M addresses including a first address and an Mth address;
    b) scanning means for scanning documents and converting said documents to N electronic pages for use in making prints of said documents;
    c) said memory storing image signals representative of said N electronic pages;
    d) a controller for combining said list of M addresses with successive selected ones of said N electronic pages for printing;
    e) a user interface with an interactive display screen, a print outline having a selected identifiable area superimposed thereon, said selected identifiable area being positioned on said print outline and representing a relative size, location and orientation of an area on each of the N prints upon which each of said M addresses is to be printed; and
    f) a printer for printing said N electronic pages with said list of M addresses to provide N a plurality of addressed prints, said N addressed prints including a first addressed print and an Nth addressed print, wherein said first address in said list of M addresses is printed at said identifiable area of said first addressed print and said Mth address in said list of M addresses is printed at said identifiable area of said Nth addressed print.

13. The set addressing apparatus of claim 12, in which the position of said selected identifiable area, on said interactive display screen, is adjustable, further comprising means for adjusting the position of said selected identifiable area on said interactive display screen.

14. The set addressing apparatus of claim 12, in which each of said M addresses is characterized by a size, further comprising means for adjusting the size of one or more addresses from said list of M addresses.

* * * * *